Nov. 13, 1956 — R. E. HONE — 2,770,042
POINT LOCATING DEVICE
Filed April 15, 1952 — 2 Sheets-Sheet 1
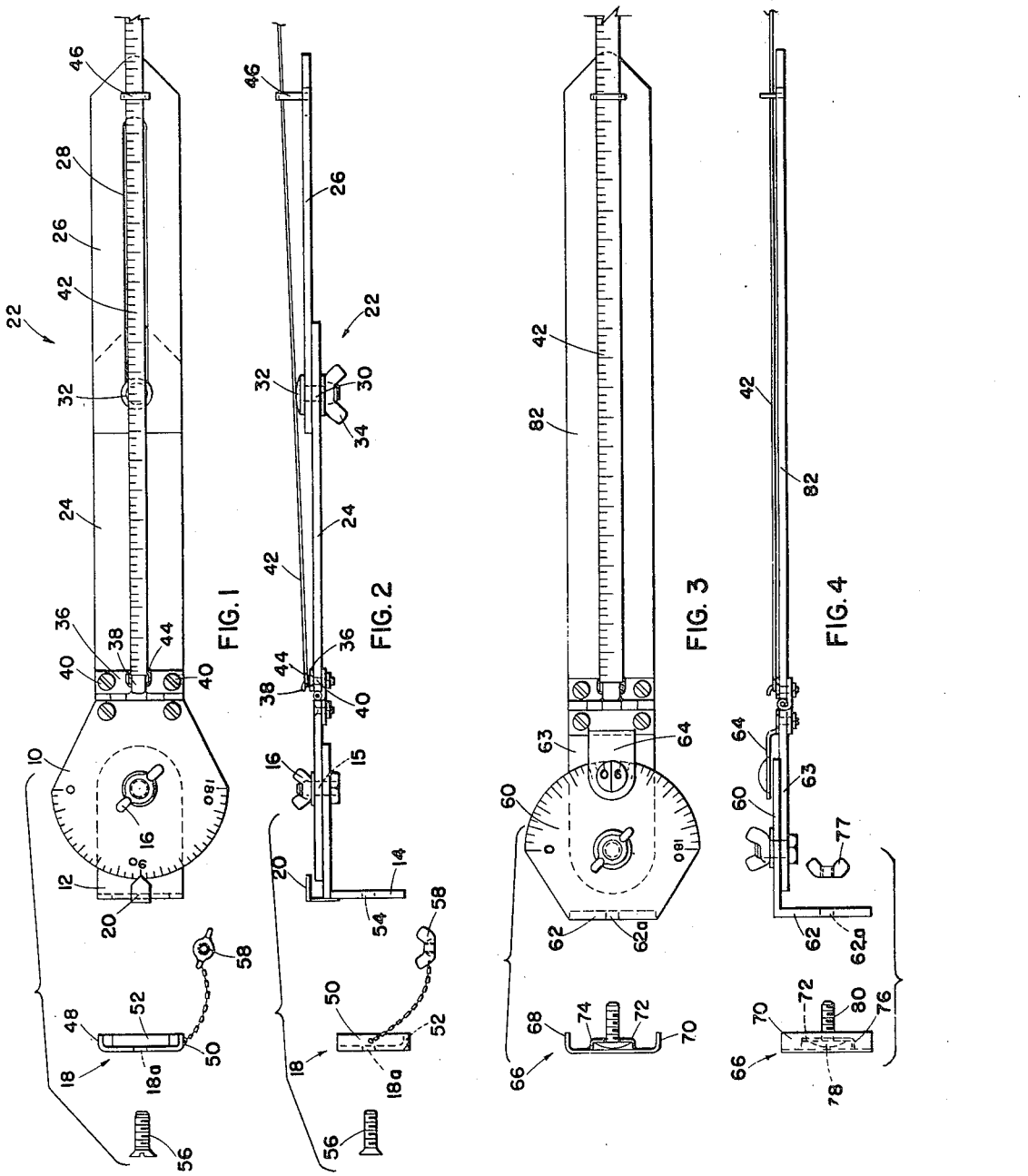
INVENTOR
ROBERT E. HONE
BY Alfred E. Miller
ATTORNEY INVENTOR
ROBERT E. HONE
BY *Alfred E. Miller*
ATTORNEY

United States Patent Office 2,770,042
Patented Nov. 13, 1956

2,770,042

POINT LOCATING DEVICE

Robert E. Hone, Greenwich, Conn.

Application April 15, 1952, Serial No. 282,415

3 Claims. (Cl. 33—75)

My invention relates to a locator, and more particularly to a given point locating or finding device. Openings for oil burner tanks, water and gas mains and other permanent installations lying below the ground surface are frequently covered by leaves, snow, dirt and other debris. Much time and effort may be consumed before the opening or valve of a particular installation can be located. In addition, damage may be done to the property in the searching process. My invention provides a device for quickly, easily and accurately locating a particular part of a parmanent installation so that the same may be uncovered and stand ready for immediate use.

Another object of my invention is to provide a lightweight and portable locating device consisting of a locator arm and protractor which is adapted to removably fit in a fixed bracket that is preferably attached to the outside walls of buildings or other permanent structures.

Another object of my invention is the provision of permanent and easily accessible data stamped or otherwise affixed to my bracket giving bearings and lineal distances to openings and the like of various permanent installations.

These and other features, objects and advantages of the present invention will become apparent from the following description considered in connection with the accompanying illustrative drawings.

In the drawings:

Fig. 1 is an exploded plan view of a point locating device embodying my invention;

Fig. 2 is an exploded side elevation view thereof;

Fig. 3 is an exploded plan view of a modification of my device;

Fig. 4 is an exploded side elevation view thereof;

Figure 5:
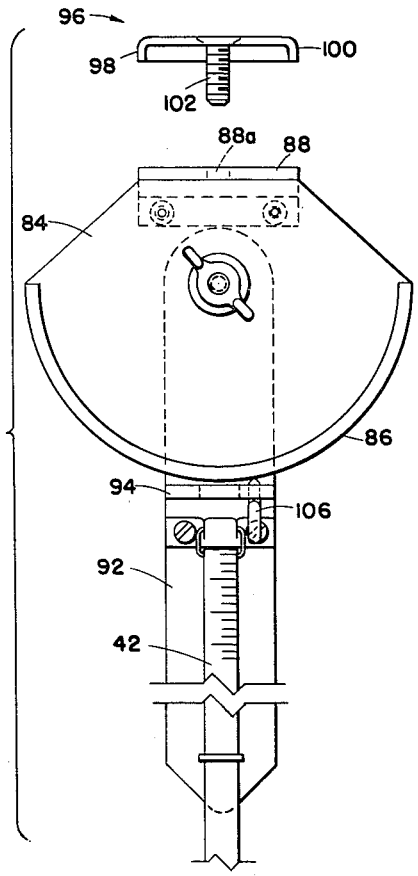
Fig. 5 is an exploded plan view of another modification of my device.

Referring now more particularly to the drawings, and especially to Figs. 1 and 2, member or part 10 has one of its edges arcuately shaped and bearing graduations similar to a protractor ranging from 0 degrees to 180 degrees. Member 10 is pivoted to a part 12 preferably by means of pivot pin 15 and fastening nut 16. Part 12 has a preferably perpendicular extension piece 14 which is adapted to be removably secured in support or bracket 18 which will hereinafter be more fully explained. An index 20 for coacting with said graduations for determining bearings is mounted on part 12. Hinged to the forward edge of part 10 is an extension arm or antideviation bar referred to generally by the numeral 22. Extension arm 22 comprises at least two sections 24 and 26. Section 26 is superposed on section 24 and is adapted to be slidable along the longitudinal axis of section 24. Accordingly, section 26 is provided with an elongated slot 28. Screw means 30 is maintained in slot 28 by means of screw head 32 and wing nut 34. It will be noted that the length of extension arm 22 may be varied by unloosening wing nut 34, sliding section 26 of extension arm 22 in one or the other direction until the desired extension arm length is secured and then tightening up on wing nut 34, thus securing section 26 to section 24 in another position. A bar 36 being provided with a struck-out lip 38 is secured to section 24 by means of screws 40. Measuring tape 42 is adapted to be removably held on lip 38 by means of its loop 44. A U-shaped guiding means 46 is mounted preferably in a position remote from said struck-out lip 38 of bar 36.

The support or bracket 18 has upstanding and converging side portions 48 and 50 and an upstanding bottom portion 52. The side portions 48 and 50 respectively converge toward each other in the direction toward the bottom portion 52. An aperture 18a also appears in support 18. In order to fix the bracket 18 to a wall, tree or the like several screws (not shown) are inserted through other apertures (not shown) in the bracket and screwed to the wall of the fixed point. Extension piece 14 of part 12 has an aperture 54 which is in alignment with aperture 18a when extension piece 14 is placed in support 18. Screw 56 and wing nut 58 fixed to said support serve to removably fasten said point locator to said support.

My point locator operates in the following manner: Extension piece 14 of part 12 is secured in support 18. Fastening nut 16 is loosened and part 12 with index 20 thereon is pivoted about graduated member 10 until the proper bearing or angular direction of the point to be located is indicated by the index 20. Fastening nut 16 is then tightened when the proper setting is obtained. Loop 44 of measuring tape 42 is then placed over struck-out lip 38 of bar 36. Thereafter tape 42 is passed through U-shaped guiding means 46 and the distance to said point to be located is measured off, the measuring tape 42 being held taut and substantially parallel to extension arm 22. Any twisting of the measuring tape 42 so as to give the improper direction of said point to be located can be immediately detected, if the tape in the guiding means is observed, and corrected. If the correct bearing and distance to said point to be located is recorded on said support the operator of this device may always pinpoint the installation or point to be located easily and with extreme accuracy. It is apparent that the hinged connection between part 10 and extension arm 22 permits accurate locating of points situated even at close proximity to support or bracket 18.

Figs. 3 and 4 show a modification of my device. In this modification part 60 has graduations thereon and also is provided with an extension piece 62 having an aperture 62a therein, while part 63 with an index 64 thereon is pivotally fixed to part 60. Extension piece 62 is adapted to be removably mounted in a support or bracket 66. Bracket 66 has two upstanding side portions 68 and 70, and positioned between said upstanding side portions are relatively smaller intermediate bent-over side flanges 72 and 74 and a bent-over bottom flange 76. Screw head 78 of screw 80 is adapted to be removably held in the area defined by bent-over flanges 72, 74 and 76. When extension piece 62 is mounted in bracket 66, wing nut 77 may be inserted and fastened upon screw 80. Extension arm 82 is hinged to part 63 and measuring tape 42 is removably held and guided on extension arm 82 in substantially the same manner as seen and described in regard to Figs. 1 and 2.

Figure 6:
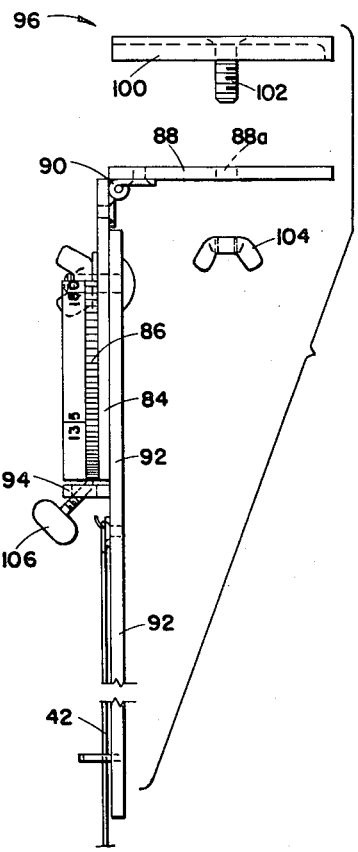
Fig. 6 is a side elevation view thereof.

In Figs. 5 and 6 parts 84 is provided with arcuate graduations thereon and a similarly arcuate, serrated edge portion 86. Extension piece 88 having an aperture 88a therein is connected to part 84 by a hinge 90. Pivoted to part 84 is an extension arm or anti-deviation bar 92 having an index 94 thereon. Extension piece 88 is adapted to be removably mounted in a support 96 having upstanding side portions 98 and 100. Centrally located in said support 96 is a threaded stud 102. When extension piece 88 is mounted in support 96, wing nut 104 may be inserted and fastened upon threaded stud 102. Mounted on index 94 is a threaded locking means 106, the end of said locking means being adapted to coact with the serrated edge portion 86 of part 84 to hold the anti-deviation bar 92 in its correct position for finding the point to be located. Measuring tape 42 is removably held and guided on anti-deviation bar 92 in substantially the same manner as seen and described in regard to Figs. 1 and 2.

Figure 7:
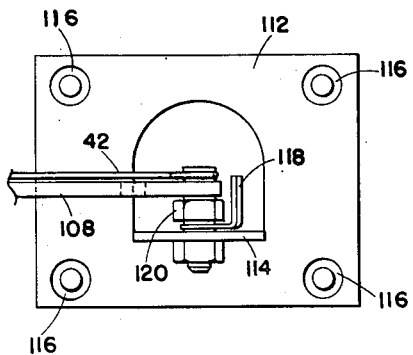
Fig. 7 is a front view of another modification of my device.
Figure 8:
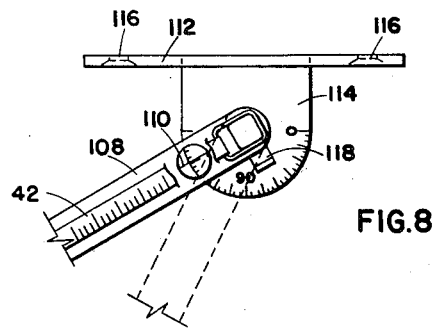
Fig. 8 is a plan view thereof.

Figs. 7 and 8 show a further modification of my device in which the extension arm 108 with an index 110 thereon is permanently held on bracket or support 112. It will be noted that there are arcuate graduations on struck-out portion 114 of support 112. Pivoted to struck-out portion 114 is extension arm 108. Support 112 is fastened to the outer wall of a building or other fixed structure by means of screws 116. An adjustable stop 118 pivoting on struck-out portion 114 may be secured in any desired position by tightening up on nut 120. Thus, stop 118 may be set so that extension arm 108 may be swung counter-clockwise until it abuts stop 118. The extension arm 108 will then be in the correct position for determining the point to be located. Measuring tape 42 is removably held and guided on extension arm 108 in substantially the same manner as seen and described in regard to Figs. 1 and 2.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

I claim:

1. The combination of a device for locating points from a known point with a measuring tape comprising a support adapted to be fixed at said known point, a locator comprising a first part provided with an index thereon, said first part being adapted to be removably held in said support, a second part pivoting on said first part, said second part having graduations thereon, an extension arm pivotally secured to said second part whereby when said second part pivots on said first part said index coacts with said graduations to give the direction of said point to be located by said measuring tape, said extension arm comprising at least two sections, one extensible section being slidable along the longitudinal axis of the other section, both of said sections being pivoted as a unit in a direction transverse to the pivotal movement of said second part, and guiding means on one of said sections for preventing said measuring tape from deviating from said direction of said point to be located.

2. The combination of a device for locating points from a known point with a measuring tape comprising a support having an aperture, a screw projecting through said aperture, said support being adapted to be fixed at said known point, a locator comprising a first part with an index thereon, nut means for fastening upon said screw to removably secure said first part in said support, a second part pivoting on said first part, said second part having graduations thereon, an extension arm having two superposed sections aligned in a common plane, one of said sections being provided with a lip for holding said measuring tape, and said extension arm being swingably mounted on said second part whereby when said second part pivots on said first part said index coacts with said graduations to give the direction of said point to be located by said measuring tape.

3. The combination of a device for locating points from a known point with a measuring tape comprising a support adapted to be fixed at said known point, a locator comprising a first part with an index thereon, said first part being adapted to be removably held in said support, a second part pivoting on said first part, said second part having graduations thereon, an extension arm swingably secured to said second part whereby when said second part pivots on said first part said index coacts with said graduations to give the direction of said point to be located by said measuring tape, said extension arm comprising at least one section superposed and slidable upon another section, one of said sections having a slot therein, means slidable in said slot for operatively connecting the two sections of said extension arm, a U-shaped guiding means on one of said sections through which said measuring tape is adapted to pass, whereby said measuring tape is prevented from substantially deviating from the direction of said point to be located, and both of said sections being swung as a unit in a direction transverse to the pivotal movement of said second part.

References Cited in the file of this patent

UNITED STATES PATENTS

| | | |
|---|---|---|
| 1,403,376 | Ballou | June 10, 1922 |
| 2,068,822 | Schiesser | Jan. 26, 1937 |
| 2,173,159 | Ewan | Sept. 19, 1939 |
| 2,632,952 | Mallow | Mar. 31, 1953 |
| 2,636,270 | McDonald et al. | Apr. 28, 1953 |
| 2,642,249 | Samuels | June 16, 1953 |